United States Patent [19]

Murakawa et al.

[11] Patent Number: 4,731,236
[45] Date of Patent: Mar. 15, 1988

[54] PROCESS FOR PRODUCING SIALON

[75] Inventors: Norihiro Murakawa, Shimonoseki; Kazuyoshi Isogaya, Tokyo; Kensaku Maruyama; Fumio Nakamura, both of Shimonoseki, all of Japan

[73] Assignee: Mitsui Toatsu Chemicals, Inc., Tokyo, Japan

[21] Appl. No.: 852,436

[22] Filed: Apr. 15, 1986

[51] Int. Cl.$^4$ .............................................. C01B 33/26
[52] U.S. Cl. ........................................ 423/327; 501/98
[58] Field of Search ........................... 501/98; 423/327

[56] References Cited

U.S. PATENT DOCUMENTS

| | | | |
|---|---|---|---|
| 4,172,108 | 10/1979 | Maeda | 501/98 |
| 4,499,193 | 2/1985 | Phelps et al. | 501/98 |
| 4,511,666 | 4/1985 | Phelps et al. | 501/98 |

FOREIGN PATENT DOCUMENTS

| | | | |
|---|---|---|---|
| 60-118615 | 6/1985 | Japan | 423/327 |
| 60-145902 | 8/1985 | Japan | 423/327 |

Primary Examiner—Steven Capella
Attorney, Agent, or Firm—Scully, Scott, Murphy & Presser

[57] ABSTRACT

A process for producing a sialon powder, which process comprises the steps of:

introducing a decomposable silicon compound, decomposable aluminum compound and a decomposable carbon compound into a steam-containing hot gas to decompose said decomposable silicon compound, aluminum compound and carbon compound in said hot gas into silicon oxide, aluminum oxide and elemental carbon, respectively, thereby producing a fine solid particle mixture consisting essentially of said silicon oxide, aluminum oxide and elemental carbon to be dispersed in said gas;

collecting said fine solid particle mixture dispersed in the gas from the gas phase by a solid-gas separating technique; and calcining the thus-obtained carbon-containing composition consisting essentially of said silicon oxide, aluminum oxide and elemental carbon, in a nitrogen containing gas atmosphere.

8 Claims, 1 Drawing Figure

PROCESS FOR PRODUCING SIALON

BACKGROUND OF THE INVENTION (i) Field of the Invention

The present invention relates to a new process for producing a sialon and more particularly to a new process for producing a sialon by preparing in vapor phase a novel carbon-containing composition comprising silicon oxide, aluminum oxide and carbon and then calcining the carbon-containing composition in a nitrogen containing gas atmosphere.

(ii) Description of the Prior Art

Sialon is a compound represented by the formula (I)

$$Si_{6-z}Al_zO_zN_{8-z} \quad (I)$$

having the crystal structure of $Si_3N_4$ and it is a substituted solid solution with part of Si substituted by aluminum and part of N substituted by oxygen. A shaped ceramic product obtained by sintering a sialon powder is far superior in mechanical strength and corrosion resistance at high temperatures as compared with conventional metallic materials and is therefore expected to be used as the material of engine and gas turbine.

According to a typical conventional method of producing a sialon powder, as disclosed in U.S. Pat. No. 3,960,581, a clay which is a relatively intimate mixture of $Al_2O_3$ and $SiO_2$, and carbon powder, are mixed using a ball mill or the like and the resulting mixture is subjected to a reductive nitrogenation in a nitrogen containing gas atmosphere, e.g. $N_2$. However, sintered or shaped ceramic products obtained from sialon powder by such conventional manufacturing method have been disadvantageous in that sintered or shaped product having constant mechanical strength can not be obtained. Because the sialon powder obtained from clay and carbon powder comprises coarse particles and therefore in order to obtain a fine powder required as a starting material of a sintered product it is necessary to pulverize the coarse sialon powder for an extremely long period of time by means of a pulverizer such as a ball mill or a vibration mill, but according to such a mechanical pulverizing method, even if the pulverization is performed for a considerably long period of time, it is actually difficult to obtain an intimately mixed, very fine sialon powder having a high mechanical strength and affording a ceramic sinter in good reproducibility. Besides, there is the problem that the operation process permits an easy incorporation of impurities.

Thus, the finer the sialon powder, the easier the sintering, and the higher the purity, the smaller the deviation in strength of the resulting sintered or shaped product. But in the case of a sialon powder obtained by the conventional method, it is impossible to ensure its fineness and purity high enough to satisfy such properties. Additionally, where a sialon powder is to be produced on an industrial scale, since the operation is performed according to a batch process, there are such problems as troublesome operations for mixing and charging the starting materials as well as an increase of cost due to a long-time pulverization, etc.

SUMMARY OF THE INVENTION

It is the object of the present invention to provide a process for easily producing an extremely fine sialon powder of high purity suitable for the production of a sintered product without using a mechanical pulverizing and mixing means.

According to the present invention there is provided a process for producing a sialon powder which process comprises the steps of:

introducing a decomposable silicon compound, a decomposable aluminum compound and a decomposable carbon compound into a hot gas containing steam to decompose in the hot gas said silicon compound, aluminum compound and carbon compound into silicon oxide, aluminum oxide and elemental carbon, respectively, thereby producing a fine solid particle mixture consisting essentially of the silicon oxide, aluminum oxide and elemental carbon to be dispersed in said gas;

collecting the dispersed solid particle mixture from the gas phase by a conventional solid-gas separating technique; and calcining the thus-collected carbon-containing composition consisting essentially of the silicon oxide, aluminum oxide and elemental carbon in a nitrogen containing gas atmosphere.

The "sialon" referred to herein is, as well known, a solid solution compound represented by the general formula (I)

$$Si_{6-z}Al_zO_zN_{8-z} \quad (I)$$

wherein z is $0 < z \leq 4.2$.

DETAILED DESCRIPTION OF THE INVENTION

Figure 1:
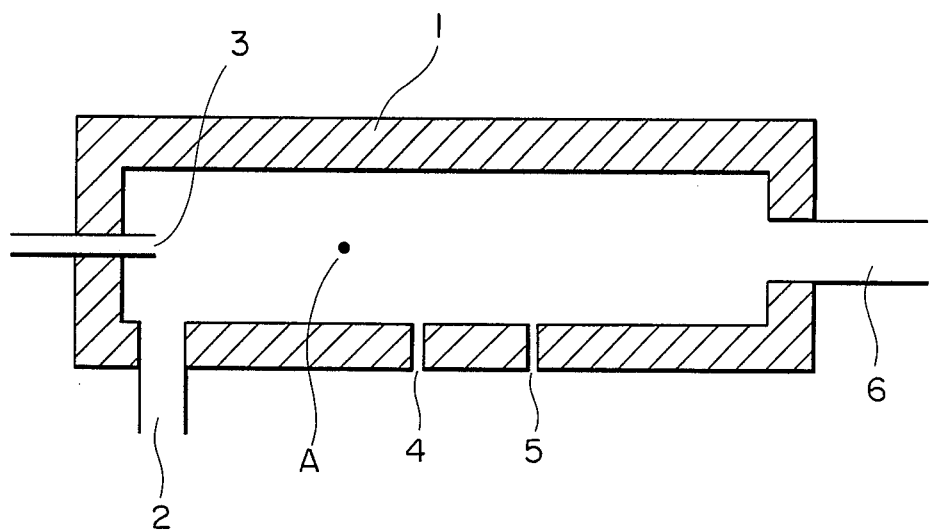
FIG. 1 is a sectional view showing an example of a furnace used for practising the present invention, in which the reference numerals 1, 2, 3, 4, 5 and 6 denote a furnace material, a duct, a burner, a nozzle, also a nozzle and a duct, respectively.

According to the present invention, first a decomposable silicon compound, a decomposable aluminum compound and a carbon compound are fed in a gaseous or finely divided (sprayed) liquid state into a hot gas containing steam and decomposed therein to obtain a dispersion in said gas of a fine solid particle mixture consisting of silicon oxide, aluminum oxide and elementary carbon.

The decomposable silicon compound used in the invention is capable of easily undergoing thermal decomposition, oxidative decomposition or hydrolysis in a hot gas containing steam to product silicon oxide. are those of the general formula (II)

$$Si_nX_{2n+2} \quad (II)$$

wherein n is an integer of 1 to 4 and X is hydrogen, halogen, alkyl, aryl, or alkoxyl, X may be the same or different in the case of $n \geq 2$. Concrete examples are $SiCl_4$, $HSiCl_3$, $H_2SiCl_2$, $H_3SiCl$, $SiH_4$, $Si_2H_6$, $Si_2Cl_6$, $Si_2F_6$, $(CH_3)_4Si$, $(CH_3)_2SiCl_2$, $CH_3SiCl_3$, $SiF_4$ and $Si(OC_2H_5)_4$.

The decomposable aluminum compound used in the invention is capable of easily undergoing thermal decomposition, oxidative decomposition or hydrolysis in a steam-containing hot gas to produce aluminum oxide. Typical examples of such decomposable aluminum compound are those of the general formula (III)

$$AlX_3 \quad (III)$$

wherein X has the same meaning as defined above. Concrete examples are AlCl$_3$, HAlCl$_2$, H$_2$AlCl, AlBr$_3$, AlH$_3$, (CH$_3$)$_3$Al, (C$_2$H$_5$)$_3$Al, (C$_6$H$_5$)$_3$Al, Al(OCH$_3$)$_3$, Al(OC$_2$H$_5$)$_3$, Al(OC$_3$H$_7$)$_3$, Al(OC$_4$H$_9$)$_3$, Al(OC$_5$H$_{11}$)$_3$ and Al(OC$_6$H$_4$CH$_3$)$_3$.

The decomposable carbon compound used in the invention is capable of easily decomposing when fed into the hot gas and producing elemental carbon (soot). Preferably, it is in a gaseous or liquid state or capable of easily assuming a liquid state under heating. Preferred examples of such decomposable carbon compound include petroleum products such as LPG, naphtha, gasoline, fuel oil, kerosene, light and heavy oils, lubricating oil and liquid paraffin; petrochemical products such as methane, ethane, propane, butane, pentane, methanol, ethanol, propanol, ethylene, acetylene, n-paraffins, butadiene, isoprene, isobutylene, benzene, toluene, xylene, cyclohexane, cyclohexene, dicyclopentadiene, ethylbenzene, styrene, cumene, pseudocumene, mesitylene, alkylbenzenes, α-methylstyrene, dicyclododecatriene, diisobutylene, vinyl chloride, chlorobenzene, C$_9$ fraction mixture and ethylene bottom; tar products such as tar, pitch, creosote oil, naphthalene, anthracene, carbazole, tar acid, phenol, cresol, xylenol, pyridine, picoline and quinoline; as well as oils and fats such as soybean oil, coconut oil, linseed oil, cotton seed oil, rapeseed oil, tung oil, castor oil, whale oil, beef tallow, squalane, oleic acid and stearic acid. It goes without saying that these are more examples and not intended to place a limitation on the decomposable carbon compound used in the invention.

Since the use of the carbon compound is for the supply of carbon, an extremely wide range of other carbon compounds than those enumerated above are also employable, but in view of the easiness of handling and carbon yield, toluene, xylene, benzene, kerosene, light and heavy oils, C$_9$ fraction mixture and ethylene bottom are particularly preferred.

According to the present invention, the decomposable silicon compound, aluminum compound and carbon compound are introduced into a steam-containing hot gas, allowing thermal decomposition, oxidative decomposition or hydrolysis reaction to take place, to produce silicon oxide, aluminum oxide and elemental carbon. In this case, a furnace is used as an apparatus for performing such thermal or oxidative decomposition or hydrolysis. Basically the furnace is a refractory-surrounded apparatus equipped with a heating unit such as a burner or an electric heater, a nozzle for supplying the silicon compound, aluminum compound and carbon compound, a hot gas supply duct and a duct for the discharge of gas containing the resulting solid particle mixture. A preferred example of the furnace used in the invention is as shown in the drawing, in which the furnace has a burner 3, material supply nozzles 4 and 5 for the supply of the silicon compound, etc., an air supply duct 2 and a hot gas discharge duct 6 and in which the numeral 1 denotes a furnace material.

In the present invention it is required that a reaction zone held at a temperature of at least 600° C., preferably not lower than 700° C., more preferably not lower than 800° C. and most preferably not lower than 1,400° C., be present within the furnace (for example, point A or thereabouts in the drawing). At a temperature meeting this requirement there are obtained elemental carbon from the carbon compound, as well as silicon oxide and aluminum oxide from the silicon compound and the aluminum compound, respectively, in a steam-containing atmosphere. These are obtained as a mixture of fine solid particles dispersed in the hot gas. Temperatures above 2,000° C. are usually not necessary because such temperatures would cause a heat loss.

The proportions of silicon, aluminum and carbon in the hot gas can be adjusted easily by merely controlling the flow rate of each component supplied into the hot gas from nozzle. In this connection, it is preferable that these feed materials, i.e., the silicon compound, aluminum compound and carbon compound, be in a gaseous or liquid state, in point of easiness of adjusting their flow rates and also in point of easiness of formation of a fine solid particle dispersion. Also adoptable is the method of dissolving, for example, a solid-phase silicon compound in a liquid-phase hydrocarbon.

Even if a small amount of a halide of elemental silicon or of elemental aluminum is incorporated in the hot gas in addition to the fine solid particles of silicon oxide or of aluminum oxide dispersed in the same gas, it does not cause any special obstacle to the practising of the present invention. The "aluminum oxide" referred to herein may include aluminum hydroxide, of course.

The steam-containing hot gas can be obtained by introducing steam into a hot gas which has been obtained by an electric heating or high-frequency heating method or an electric discharge method. But a simpler method is to burn in air a combustible material which produces steam on burning, such as hydrogen, methane, ethane, propane, butane, or the starting hydrocarbon. The latter method is advantageous from the aspect of equipment structure and more economical from the aspect of thermal efficiency.

The decomposable silicon compound and aluminum compound used in working the present invention have not only the property of changing into solid matters of elemental silicon and aluminum upon thermal decomposition reaction thereof in the steam-containing hot gas, but also the property of changing into silicon oxide and aluminum oxide upon hydrolysis reaction thereof with steam. Besides, these reactions proceed extremely rapidly and are completed in about 0.1 to 0.5 second. Therefore, if the residence time in the reaction system is set at about 1 to 10 seconds, then in an atmosphere wherein both heat and steam are present, it is possible to substantially completely react the silicon compound and the aluminum compound without remaining their unreacted compounds in the mixture taken out of the furnace.

The thus-obtained gas-solid mixture consisting of the hot gas and a mixture of fine solid particles of the silicon oxide, aluminum oxide and elemental carbon dispersed in the hot gas is discharged to the exterior of the furnace and then the solids dispersed in the gas are collected by a solid-gas separating operation using a collecting device such as a bag filter, a cyclone or an electric precipitator. For diminishing the heat load of the collecting device, it is desirable to cool the discharged hot gas in advance. Any cooling method may be used. For example, there may be adopted a means of cooling the reaction zone after reaction or pouring water.

The thus-collected carbon-containing composition comprising silicon oxide, aluminum oxide and elemental carbon is then calcined in a nitrogen compound gas atmosphere such as nitrogen gas and ammonia at a temperature in the range of 1,350° to 1,800° C., preferably 1,350° to 1,650° C., more preferably 1,400° to 1,600° C., for 2 to 20 hours, preferably 5 to 12 hours, using a high frequency heating furnace or an electric resistance furnace, whereby there is obtained a sialon powder.

As to the proportions of silicon, aluminum and carbon in the carbon-containing composition, if the ratio of the gram-atom number of the carbon contained to that of the silicon plus aluminum contained, i.e. C/(Si+Al), is defined as a carbon content ratio ($=\alpha$), then $0.5 \leq \alpha \leq 30$, more preferably $1 \leq \alpha \leq 20$, still more preferably $2 \leq \alpha \leq 8$, and if the ratio of the gram-atom number of the aluminum contained to that of the silicon contained, i.e. Al/Si, is defined as an aluminum-silicon ratio ($=\beta$), then $0 < \beta \leq 2.33$, more preferably $0.1 \leq \beta \leq 2.3$, still more preferably $0.2 \leq \beta \leq 2.0$. The upper limit of the carbon content ratio $\alpha$ is basically not limited, but if carbon is excess and $\alpha$ exceeds 30, a waste of the starting carbon compound will result. The other requirements for the composition ratio are for obtaining in high yield a sialon having a stoichiometric composition of formula (I).

The above ratios in the carbon-containing compound substantially correspond to composition ratios in the starting materials. Therefore, the decomposable silicon compound, aluminum compound and carbon compound are used in the above ranges of $\alpha$ and $\beta$.

As to the nitrogen containing gas, nitrogen gas and ammonia are preferred in point of easiness of handling and economy as well as function and effect. But also employable are hydrocarbon derivatives of ammonia such as methylamine, dimethylamine, trimethylamine, ethylamine, dimethylethylamine, diethylamine, triethylamine, i-propylamine, n-propylamine, ethylenediamine, aniline, N-methylaniline, N,N-dimethylaniline, toluidine, xylidine, benzylamine, diphenylamine and naphthylamine, as well as hydrazine, methylhydrazine, ethylhydrazine, isopropylhydrazine, phenylhydrazine, benzylhydrazine, naphthylhydrazine, N,N'-dimethylhydrazine, N,N'-diethylhydrazine, N-methyl-N'-phenylhydrazine and N,N'-diphenylhydrazine. These are used each alone or as a mixture and may be diluted with an inert gas such as helium or neon.

Before calcining the carbon-containing composition in the nitrogen containing gas atmosphere, it is desirable for obtaining a fine sialon powder to subject the carbon-containing composition to a conventional bulk density increasing operation, for example, compression, pressurizing or granulating. This is based on the present inventors' experimental knowledge that if the carbon-containing composition is calcined in the state of a small bulk density, a rod-like composite carbide with particles grown in one direction is apt to be formed, but if the calcining is performed after the bulk density increasing operation, there is obtained a spherical powder having a uniform particle size. In this case it is preferable that the bulk density of the carbon-containing composition be increased to at least 0.15 g/cc.

The sialon powder obtained according to the process of the present invention may contain elemental carbon, which carbon can be burnt off easily by heating the sialon to a temperature of 500° to 1,000° C. in the presence of oxygen. This removal of the incorporated carbon can be effected easily by heating the sialon in air or placing it in an oxygen-containing hot gas atmosphere obtained by burning fuel in excess air.

The decomposable silicon compound, aluminum compound and carbon compound are fed into the steam-containing hot gas and subjected to such a chemical reaction as thermal decomposition, oxidative decomposition or hydrolysis therein whereby fine particles of silicon oxide, aluminum oxide and elemental carbon are produced and at the same time mixed in vapor phase. Therefore, by subjecting the resulting mixture to solid-gas separation there is obtained a carbon-containing composition as an intimate mixture of very fine particles without adopting any such mechanical pulverizing and mixing means as in the prior art. Besides, unlike the conventional batch process, it is possible to obtain the said composition continuously in a single stage, and therefore the troublesomeness of operating as in the prior art is reduced to a remarkable extent. Moreover, since the sialon powder obtained by calcining the carbon-containing composition with the nitrogen compound gas is already in the form of a fine powder, it is not necessary to pulverize coarse particles mechanically as in the prior art, and all of such problems as increase of cost, troublesome operation and incorporation of impurities during operation are eliminated. Thus, outstanding function and effect are attained by the present invention.

DESCRIPTION OF THE PREFERRED EMBODIMENT

The following examples are given to further illustrate the present invention.

EXAMPLE 1

The furnace (300 mm dia. by 3 m long) shown in FIG. 1 was used. Air and propane as a hot air fuel were fed from the duct 2 and burner 3 at flow rates of 100 Nm³/H and 3 Nm³/H, respectively. Further, a 1:0.7 mixture (weight ratio) of $SiCl_4$ as a silicon compound and heavy oil A as a carbon compound was charged into the furnace from the nozzle 4 at a flow rate of 14 kg/H, while $AlCl_3$ as an aluminum compound was charged into the furnace from the nozzle 5 at a flow rate of 4 kg/H. The interior of the furnace was held at a temperature of about 1,350° C. at the position A in FIG. 1. Hot air containing fine solid particles produced in the furnace was withdrawn from the duct 6 and cooled, then collected by a bag filter to afford 6.6 kg/H (dry weight) of a carbon-containing composition comprising silicon oxide, aluminum oxide and carbon. In this carbon-containing composition were contained, as elements, 24.8 wt. % silicon, 11.9 wt. % aluminum and 23.9 wt. % carbon (the rest being 38.9 wt. % bonding oxygen, 0.4 wt. % carbon-adhered hydrogen and not more than 0.1 wt. % others). As a result of ESCA (electron spectroscopy for chemical analysis) there were observed only Si—O and Al—O bonds as bonding forms of silicon and aluminum with another element.

The bulk density of the carbon-containing composition taken out from the bag filter was 0.088 g/cc. 30 g of this composition was placed in a cylindrical vessel and compressed uniaxially to a bulk density of 0.32 g/cc. The thus-compressed composition was charged into a horizontal type annular resistance furnace and calcined in a nitrogen gas atmosphere at 1,500° C. for 9 hours, then once cooled and thereafter heated to 700° C. in air to burn off the remaining elemental carbon, yielding 17.9 g of powder.

As a result of X-ray diffractometry, this powder proved to be $\beta$-sialon, and as a result of chemical analysis the value of z in $Si_{6-z}Al_zO_zN_{8-z}$ was found to be 2.0. Further, in an image analysis with an electron microscope the powder proved to have an average particle diameter of 0.12 μm and a uniformly spherical particle shape.

EXAMPLES 2-5

Carbon-containing compositions were obtained as shown in Table 1 in the same way as in Example 1, using methane and hydrogen in addition to propane as hot air fuels and using those set out in Table 1 as silicon compounds, aluminum compounds and carbon compounds. As a result of ESCA there were observed only Si—O and Al—O bonds as bonding forms of silicon and aluminum with another element.

(Note: In Table 1, the starting materials fed through the same nozzle indicate that they were supplied as a mixture thereof. For example, in Example 2, $CH_3SiCl_3$ and $AlCl_3$ and benzene were mixed in advance and then fed from the nozzle 4.)

The carbon-containing compositions thus obtained were compressed in the same manner as in Example 1 and then calcined at the temperatures and hours shown in Table 2 using $NH_3$ in addition to $N_2$ as nitrogen compounds, to afford sialons in the amounts set out in the same table.

As a result of X-ray diffractometry, the sialons proved to be $\beta$-sialons, and as a result of chemical analysis the sialons were found to have such z values in $Si_{6-z}Al_zO_zN_{8-z}$ as shown in Table 2. Further, in an image analysis with an electron microscope it was observed that the sialons had such average particle diameters as shown in Table 2 and each had a uniformly spherical particle shape.

TABLE 1

| Example No. | 2 | 3 | 4 | 5 | 6 |
|---|---|---|---|---|---|
| Air $Nm^3/H$ | 100 | 100 | 100 | 100 | 100 |
| Fuel for Hot Air | | | | | |
| Name | propane | methane | methane | hydrogen | hydrogen |
| $Nm^3/H$ | 3 | 6 | 4 | 18 | 12 |
| Temperature at Point A °C. | 1350 | 1100 | 800 | 1050 | 860 |
| Silicon Compound | | | | | |
| Name | $CH_3SiCl_3$ | $H_2SiCl_2$ | $Si(OC_2H_5)_4$ | $(CH_3)_2SiCl_2$ | $HSiCl_3$ |
| kg/H | 7.0 | 7.0 | 15.0 | 5.5 | 10.0 |
| Nozzle | 4 | 4 | 4 | 4 | 4 |
| Aluminum Compound | | | | | |
| Name | $AlCl_3$ | $AlH_3$ | $Al(OCH_3)_3$ | $Al(OC_3H_7)_3$ | $Al(OCH_3)_3$ |
| kg/H | 6.0 | 0.41 | 6.2 | 17.4 | 0.81 |
| Nozzle | 4 | 5 | 4 | 4 | 4 |
| Carbon Compound | | | | | |
| Name | benzene | tetrahydrofuran | n-hexane | $C_9$ fraction mixture | toluene |
| kg/H | 7.0 | 11.0 | 7.4 | 6.9 | 10.5 |
| Nozzle | 4 | 5 | 4 | 4 | 4 |
| Carbon-containing Compositions of the Present Invention | | | | | |
| Amount obtained kg/H | 7.0 | 6.3 | 9.5 | 9.9 | 8.2 |
| Composition | | | | | |
| Si wt % | 18.5 | 30.4 | 20.9 | 11.9 | 24.9 |
| Al | 17.8 | 5.8 | 14.4 | 22.9 | 2.2 |
| C | 26.4 | 23.4 | 28.1 | 30.6 | 30.4 |
| O | 37.0 | 39.9 | 36.5 | 34.0 | 42.2 |

TABLE 2

| Example No. | 2 | 3 | 4 | 5 | 6 |
|---|---|---|---|---|---|
| Carbon-containing Compositions of the Present Invention g | 40 | 20 | 50 | 50 | 50 |
| Bulk Density before Heating g/cc | 0.41 | 0.20 | 0.48 | 0.65 | 0.53 |
| Heating Atmosphere | $N_2$ | $N_2$ | $NH_3$ | $NH_3$ | $NH_3$ |
| Heating Temperature °C. | 1550 | 1550 | 1450 | 1450 | 1500 |
| Heating Time H | 10 | 10 | 8 | 6 | 6 |
| Amount of Sialon produced g | 25.0 | 11.9 | 28.4 | 29.5 | 21.7 |
| "z" Value of Sialon produced | 3.1 | 1.0 | 2.4 | 4.0 | 0.5 |
| Average Particle Diameter $\mu m$ | 0.23 | 0.16 | 0.11 | 0.14 | 0.12 |

What is claimed is:

1. A process for producing a sialon powder, which process comprises the steps of:
   introducing a decomposable silicon compound, decomposable aluminum compound and a decomposable carbon compound into a steam-containing hot gas to decompose said decomposable silicon compound, aluminum compound and carbon compound in said hot gas into silicon oxide, aluminum oxide and elemental carbon, respectively, thereby producing a fine solid particle mixture consisting essentially of said silicon oxide, aluminum oxide and elemental carbon dispersed in said gas;
   collecting said fine solid particle mixture dispersed in said gas from the gas phase by a solid-gas separating technique to obtain a carbon-containing composition consisting essentially of said silicon oxide, aluminum oxide and elemental carbon, and calcining said composition in a nitrogen containing gas atmosphere.

2. A process as set forth in claim 1, wherein said decomposable silicon compound is a compound represented by the formula $$Si_nX_{2n+2}$$

where n is an integer of 1 to 4 and X is hydrogen, halogen, alkyl, aryl, or alkoxy, provided the X's may be the same as or different from each other in the case of $n \geq 2$.

3. A process as set forth in claim 1, wherein said decomposable aluminum compound is a compound represented by the formula $$ALX_3$$

where X is hydrogen, halogen, alkyl, aryl or alkoxy.

4. A process as set forth in claim 1, wherein the calcination of said carbon-containing composition is performed at a temperature in the range of 1,350° to 1,800° C.

5. A process as set forth in claim 1, wherein Si, Al and C in said carbon-containing composition are in the following ratios:

$0.5 \leq C\ (\text{g-atom})/(Si+Al)\ (\text{g-atom}) \leq 30$ $0 < Al\ (\text{g-atom})/Si\ (\text{g-atom}) \leq 2.33$.

6. A process as set forth in claim 1, wherein the nitrogen containing gas atmosphere is $N_2$.

7. The method of claim 1 where the bulk density of said composition is increased prior to said calcining.

8. The process of claim 7 where the bulk density of said composition is increased to at least about 0.15 g/cc prior to said calcining.

* * * * *